F. E. WHITNEY.
BATTERY SEPARATOR.
APPLICATION FILED SEPT. 20, 1917.
1,245,080.
Patented Oct. 30, 1917.
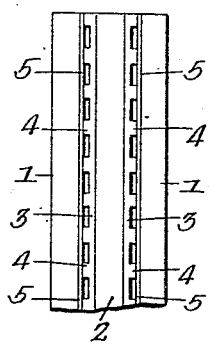
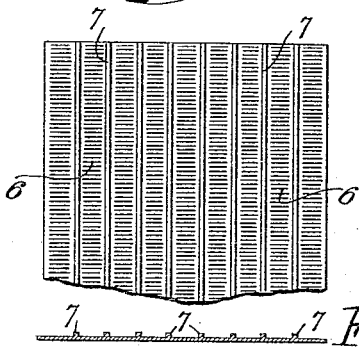
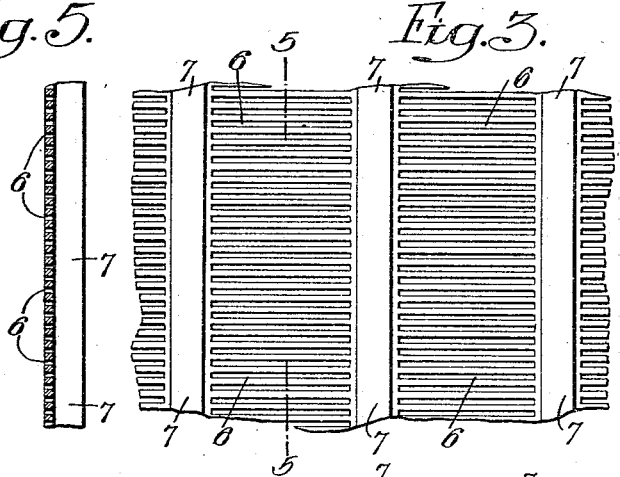
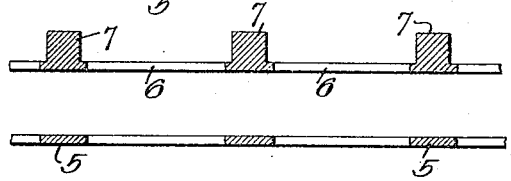
Inventor-
Frank E. Whitney.
by his Attorneys.-
Howson & Howson

UNITED STATES PATENT OFFICE.

FRANK E. WHITNEY, OF PHILADELPHIA, PENNSYLVANIA, ASSIGNOR TO COMMERCIAL TRUCK COMPANY OF AMERICA, OF PHILADELPHIA, PENNSYLVANIA, A CORPORATION OF PENNSYLVANIA.

BATTERY-SEPARATOR.

1,245,080.    Specification of Letters Patent.    Patented Oct. 30, 1917.

Continuation of application Serial No. 34,705, filed June 17, 1915. This application filed September 20, 1917. Serial No. 192,314.

*To all whom it may concern:*

Be it known that I, FRANK E. WHITNEY, a citizen of the United States, residing in Philadelphia, Pennsylvania, have invented a Battery-Separator, of which the following is a specification.

In order to prevent the dislodgment of active material from the electrodes of storage batteries of the flat plate type it is customary to provide flat structures of insulating material in engagement with the faces of said electrodes, and these while provided with openings to permit of the access of the electrolyte, for the most part covered the surfaces of the latter in order to accomplish the above noted object. A large proportion of the active material nevertheless became dislodged and passed out through the retaining structures whose perforations so far as I am aware, have been circular in outline, ultimately falling to the bottom of the battery jar.

One object of the present invention therefore is to provide a retaining plate, which may also serve as a separator, which while provided with openings of the aggregate area, required to permit of the passage of electrolyte to the surface of the electrode, shall be of such form and dimensions as to reduce to a minimum the active material capable of becoming dislodged.

A further object of the invention is to provide a novel form of separator or retaining plate which in addition to maintaining the electrodes of a storage battery at the proper distances apart while providing channels between them for the circulation of the electrolyte, shall have openings or perforations leading from these channels to the surface of said plate of such form and dimensions as to retain the active material in place and at the same time expose sufficient plate surface to the electrolyte to allow the battery to properly perform its functions.

These objects and other advantageous ends I secure as hereinafter set forth, reference being had to the accompanying drawings, in which Figure 1 is a portion of a battery separator constructed according to my invention;

Fig. 2 is a transverse section of the structure shown in Fig. 1;

Figs. 3 and 4 are respectively an elevation and a horizontal section showing on an enlarged scale the detail construction of the separator plate illustrated in Fig. 1;

Fig. 5 is a vertical section on the line 5—5, Fig. 3;

Fig. 6 is a horizontal section of a slightly modified form of the device constituting my invention; and Fig. 7 is a fragmentary plan illustrating one form of my invention as applied to a storage battery.

In Fig. 7 of the above drawings 1 represents two of the positive electrodes of a secondary or storage battery and 2, one of the negative electrodes;—it being noted that said positive electrodes are flat in form and are of the pasted type, using lead peroxid as their active material. Between each of the positive electrodes and the negative electrode is inserted a separator 3 in the form of a flat plate having vertically extending ribs 4, and between the ribbed face of each of these separators and the adjacent positive plate is mounted a relatively much thinner plate 5 of some insulating material such as hard rubber which lies in direct and intimate contact with the surface of said electrodes.

This retaining plate 5 according to my invention is provided with any desired number of series of relatively narrow elongated slots 6 formed by punching or otherwise bodily removing narrow elongated pieces of said plate and while in the forms illustrated in Figs. 6 and 7, its two faces are plane so that it may be employed with the separator plates 3, it may be made with a series of parallel ribs 7 as illustrated in Figs. 1 to 5 inclusive. It is to be noted that the slots 6 are of relatively great length as compared with their width, being slightly more than 1/100 of an inch in width, that is, about 125/10,000 of an inch and about 3/16 of an inch in length and that adjacent slots are separated by distances likewise greater than their width. The plates themselves are usually about 1/64 of an inch in thickness so that it is noted that the slots are of less width than such thickness. When the plates are constructed as shown in Figs. 1 to 5, the ribs 7 project from the unperforated plane portions between the ends of each two adjacent series of slots.

It is to be noted that the diameter of a circular opening having the same area as one of the slots 6 would be several times greater than the width of said slot, so that obviously the latter is more effective by reason of its narrowness in preventing the dislodgment of active material from the surface of the electrode to which it is adjacent, while exposing the same amount of active material. By my invention therefore the amount of active material falling out of a battery plate after prolonged operation is considerably less than would be the case with plates having circular openings of the same aggregate area but of other forms, and the life and efficiency of the battery is usually materially increased.

While as shown in Fig. 7, I may use thin plates of non-conducting material in connection with ribbed or other forms of separator plates, the latter may be omitted if desired and plates made according to my invention, having ribs 7, may advantageously be employed to replace both sets of plates 3 and 5. In such case the plane surface of each plate would be placed in direct engagement with the surface of the adjacent positive electrode so that the electrolyte is free to circulate through the channels defined by the ribs and the surface of the negative electrode. As before while the necessary area of electrode surface is exposed to said electrolyte, the slots in the separator or retaining plates are so narrow as to practically prevent the dropping out of the active material.

As this application possesses matter in common with an application filed by me June 17, 1915, Serial No. 34,705, it is to be treated as a continuation of said prior application as far as such common subject matter is concerned.

I claim:—

1. As a new article of manufacture a battery separator consisting of a plane, relatively thin sheet of insulating material having portions removed from its body to form therein a series of elongated, relatively narrow slots of a width approximately .0125 of an inch.

2. As a new article of manufacture a battery separator consisting of a plane, relatively thin sheet of insulating material having portions removed from its body to form therein a series of elongated, relatively narrow slots of a width less than the thickness of said sheet.

3. The combination in a storage battery of a flat pasted plate constituting a positive electrode having peroxid of lead as its active material; separators mounted immediately adjacent the flat faces of said electrode and consisting of plane, relatively thin sheets of insulating material each having portions removed from its body to form therein a series of elongated relatively narrow slots of a width sufficiently small to prevent the passage of material amounts of the lead peroxid of said plate but wide enough to permit access of electrolyte to said peroxid in amounts sufficient to prevent undue weakening of the electrolyte during discharge.

In witness whereof I affix my signature.

FRANK E. WHITNEY.